Figure 1:
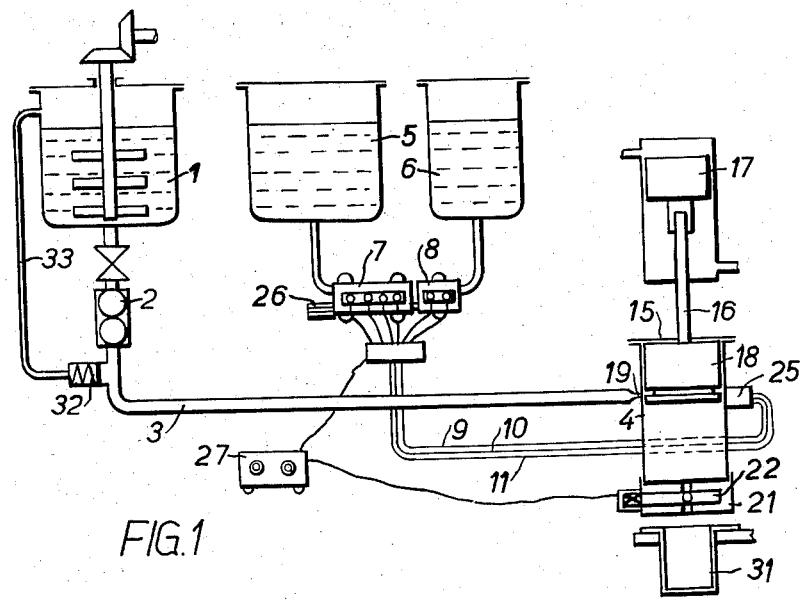

SECTION a-b

INVENTORS:
ERWIN WEINBRENNER, KARL BREER.
BY Elmer P. Rucker
ATTORNEY

United States Patent Office 2,885,268
Patented May 5, 1959

2,885,268
PROCESS AND APPARATUS FOR THE PRODUCTION OF POROUS OR HOMOGENEOUS PLASTIC SEMI-FINISHED PRODUCTS OR FINISHED ARTICLES, MORE ESPECIALLY THOSE BASED ON POLYURETHANES

Karl Breer, Koln-Flittard, and Erwin Weinbrenner, Leverkusen-Bayerwerk, Germany, assignors to Farbenfabriken Bayer Aktiengesellschaft, Leverkusen, Germany, a corporation of Germany Application June 3, 1955, Serial No. 513,134
Claims priority, application Germany June 4, 1954
11 Claims. (Cl. 23—252)

This invention relates to a process and apparatus for the production of porous or homogeneous plastic semi-finished products or finished articles, more especially those based on polyurethanes.

It has already been proposed in such a process to mix the different components, i.e. the reactants, such as, for example, polyisocyanates and polyesters, and the accelerators and other components, by injecting one or more of these components into a flowing stream of a main component, for example a polyester. This process, however, cannot be carried out satisfactorily with the interruptions necessary, for example, for emptying small moulds serially or individually, or for repeatedly filling hollow containers. The continuous flow of such a mixture of materials cannot be interrupted as desired, since, on account of the reactivity of the mixture, the ejection nozzle or the mixing chamber becomes clogged if the flow is interrupted.

It has now been found that the injection mixing method can be used for intermittent ejection if, in accordance with the invention, the individual components of the mixture are fed under pressure into a closed mixing chamber, from which the resulting mixed material is ejected by means of a piston, for example a hydraulically, pneumatically or mechanically operated piston through a nozzle which is controlled and opened in a timed sequence. The flowing stream of the main component is preferably fed into a cavity or recess in a piston movable in a cylinder and is forced from the piston cavity into the cylinder space disposed on the ejection side of the piston, the stream being simultaneously mixed inside or outside the piston cavity with the other components sprayed into the cylinder space. The mixture thus produced is ejected by means of the moving piston through a cylinder outlet port which is adapted to be opened after the inflow of the main component has been stopped by the piston itself and the inflow of the secondary component has been stopped by a control appliance upon completing the mixing operation.

In order to avoid the danger of jamming the piston because of the residues of the reactive mixture of materials, the ejection impulses are preferably caused to take place in such quick succession that, during the filling of the mixing chamber subsequently to a discharge operation, a further component, which at the same time serves as a solvent for the mixture, is caused to flow in and to dilute any possible residues of the reactive mixture which could possibly be in the mixing chamber. At the same time, a further amount of the additional component to be mixed is injected into the component which serves as flushing medium. In this way, it is possible to obtain an intermittent discharge of small amounts of mixed material in rapidly succeeding impulses, and also, if larger discharge quantities are desired, to eject materials by means of a rhythmic period of separate discharges. Another possible method of variation is to provide a mixing chamber of variable length.

The quantity of one of the components of the mixture, for example the main component, is preferably controlled by maintaining a motoring pump connected between a supply container and the mixing chamber continuously in motion, and rhythmically opening and closing the supply pipe to the mixing chamber by means of the position of the piston. The mixing chamber may have a volume of 01–100 liters. A chamber having a volume of 145 ccm. may, for instance, be filled in 3 seconds using an injection pump which makes 50 injections per minute. The chamber can then be emptied in 1.5 seconds. The inner pressure of the mixing chamber may vary from 10 to 100 atm. The main component is fed to the chamber at a pressure ranging from 1–100 atm., depending on the viscosity of the component.

There should be a return flow to the supply container when the supply pipe is closed, this being by way of an overflow valve set to a predetermined pressure. The component controlled in this manner serves at the same time as a flushing medium. Another suitable method for supplying this component to the mixing chamber is to feed the component into an annular groove located on the piston.

Other components of the mixture are preferably injected under a pressure ranging from 10–1000 atm., depending on the viscosity of said component through a nozzle into the mixing chamber, for example by using single-stage or multistage high-speed piston pumps which eject measured amounts of material by means of impulses in rapid sequence, e.g. 150 injections in a period of 3 seconds. Control means for limiting the amount of the components flowing into the mixing chamber can be provided by a coupling system controlled by a timing sequence, for example by a magnetic clutch, which is controlled by a control appliance and thus adjusts the timing of the control rod of the pumps.

Engagement and disengagement of the control means of the metering pumps can be made to open or close the ejection valve of the mixing chamber in the same sequence by means of the electrical control appliance or other mechanical principles. The closure means of the chamber can take the form of rotary slide valves or flat gate-type slide valves, for example. When components which can be mixed only with difficulty are used, it is desirable to provide supplementary stirring in the mixing chamber. For this purpose, the ejections piston can be made to be rotatable. As stirring mechanism, the piston can have arranged therein retractable pins or other elements which are retracted into the piston during the downward movement for ejecting the mixed material, whereby the piston is able to eject all the material contained in the mixing chamber.

Another possible method of stirring is to blow a stream of gas or air preferably in whirls tangentially through the material. For supplying the moulds to be filled, it is possible to use a rotatable table arrangement or a travelling belt, the forward movement of the moulds to be filled being controlled by the control appliance in timed sequence with the ejection of the mixture.

Figure 2:
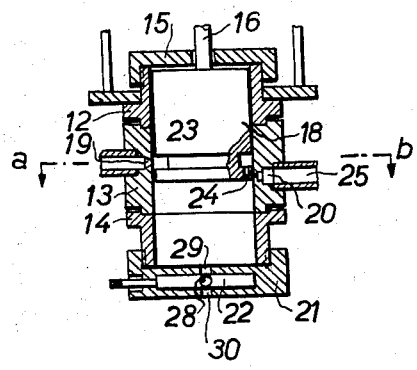
Figure 3:
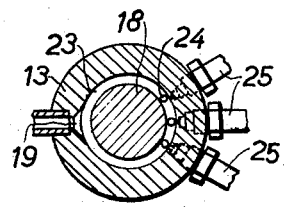

One embodiment of an apparatus in accordance with the invention is shown diagrammatically and by way of example in the figures of the accompanying drawing, wherein Figure 1 shows a complete installation,
Figure 2 is a longitudinal section through the cylindrical mixing chamber of the installation shown in Figure 1, and
Figure 3 is a cross-section through the mixing chamber, taken on the line a—b of Figure 2.

The main component, for example a polyester, is supplied from a container 1 by means of a gear-wheel pump 2 and by way of a pipe 3 to a measuring and mixing device 4. At the same time, reaction liquids, for example polyisocyanates and activator, disposed in containers 5 and 6 respectively, are supplied to the said device 4 by means of high-pressure pumps 7 and 8 and pipe 9, 10 and 11. As will be seen from Figures 2 and 3, the measuring and mixing device 4 comprises a cylinder consisting of three annular sections 12, 13 and 14. The annular section 12 is the upper cylinder ring which is provided with a cap 15 through which is guided a piston rod 16 connected at one end to a hydraulically driven reciprocating piston 17 and at the other end to a reciprocating ejection piston 18. The annular section 13 of the cylinder contains an admission slot 19 and also a bore 20, both of which open into the interior of the cylinder. The admission slot 19 serves for the supply of the main component, for example a polyester, and the bore 20 for the supply of the other reaction components. The annular section 14 of the cylinder carries a cap 21 in which a rotary slide valve 22 is arranged. The reciprocating ejection piston 18 is provided near its end with an annular groove 23, which is in communication with the cylinder space by way of bores 24.

The admission slot 19 connected to the pipe 3 for the main component is arranged in the annular part 13 of the cylinder in such manner that it is at the same level as the annular groove 23 of the ejection piston 18 when the latter is in its upper dead-centre position, so that the main component may pass through the port 19 into the annular groove 23 when the piston is in the upper dead-centre position. The bores 20 for accommodating the injection nozzles 25 for the other components are located near the end of the piston 18 and the communicating bore 24. The measuring and mixing of the components takes place in the following manner:

The main component, for example a polyester or a mixture of a polyester with an activator, is supplied under pressure through the slot 19 and enters the annular groove 23 of the piston 18 when the latter is in the upper dead-centre position, fills the annular groove, and flows through the bore 24 into the cylinder space below the piston. At the same time, the other components are injected through the injection nozzles 25 transversely into those streams of the main component which are issuing from the openings 24 of the piston, these other components preferably being injected with a high rate of impulse so that they are mixed with the main component.

The time needed for the introduction of the components can, so far as is permitted by the capacity of the cylinder space, be adjusted as desired by closing the slot for the admission of the main component by moving the piston downwards and by simultaneously interrupting the injection of the additional components, i.e. by the injection nozzles being no longer supplied by the pumps. The supply to the injection nozzles is timed by closing the outlets of the pumps 7 and 8 by means of a blocking rod 26 which is common to all pumps. The blocking rod 26 is actuated electro-magnetically with the closing of the pump outlets and with the commencement of the downward travel of the ejection piston 18, the valve being opened by bringing a transverse bore 28 of the rotatable member 22 into coincidence with bores 29 and 30 in the cover 21. The mixed material located in the cylinder space below the piston is ejected through the bores 28, 29 and 30 by the downwardly moving piston 18, and thus passes into a mould 31. The mechanism for the supply of the moulds 31 can be controlled by the control appliance 27 in timed sequence with the operation of the system.

The main component, which is being continuously supplied by means of the pump 2, is returned to the supply container 1 by way of an overflow valve 32 and a return pipe 33 when the nozzle 19 is closed by the downward travel of the piston. The main component can alternatively be supplied intermittently in timed sequence with the upward and downward movement, i.e. the reciprocating movement, of the piston, so that in such a case the return pipe system becomes superfluous.

The times between the filling, mixing and ejection operations in the cylinder are preferably kept so short that any of the mixture left behind in the cylinder, more especially in the annular groove of the piston, can be flushed out by means of the next charge.

Polyurethanes and similar reaction products of polyisocyanates and organic substances containing at least two active hydrogen atoms are readily prepared by using mixing devices in accordance with the invention.

Polyesters, polyester amides and polyethylene glycols are suitable starting materials for the reaction with polyisocyanates. The substances which may be reacted with polyisocyanates may be substances in these classes which have a linear structure, or those which contain branch chains in the molecule.

The said polyesters may be prepared from the known synthesis components, of which, for example, hydroxycarboxylic acids, dicarboxylic acids, glycols, diamines, amino alcohols or amino carboxylic acids are the main classes. A few representatives of these classes of substances are to be mentioned by way of explanation but not for limiting the possible combinations.

Suitable acids are: malonic acid, succinic acid, adipic acid, methyl adipic acid, sebacic acid, dihydromuconic acid, thiodipropionic acid, maleic acid, phthalic acid, terephthalic acid, tricarballyl acid, tartaric acid.

Examples of glycols which may be mentioned are: ethylene glycol, di-, tri- and poly-ethylene glycol, 1,2-propylene glycol, 1,4-butylene glycol, 1,6-hexanediol, glycerine, pentaerythritol, trimethylol propane, hexanetriol. As examples of nitrogen-containing products, there are to be mentioned: ethylene diamine, tetramethylene diamine, hexamethylene diamine, N-methyl dipropylene triamine, piperazine, phenylene and naphthylene diamines, ethanolamine, propanolamine, N-methyl diethanolamine, hydroxyethyl aniline. The formation of the polyesters and polyester amides takes place by heating the components to elevated temperatures according to known processes. Polyesters and polyester amides having varying average molecular weights and different terminal groups are formed, according to the type and amount of the reactants which are used. The said terminal groups may be hydroxyl, carboxyl or also amino groups. In the polycondensation processes, however, it is preferable to use an excess of glycols, so that the resulting end products contain hydroxyl terminal groups. The said polyglycol ethers may be obtained by polymerisation of alkylene oxides, for example ethylene oxide, or by addition of alkylene oxides to polyfunctional alcohols, such as ethylene glycol, trimethylol propane, pentaerythritol, etc. They are all characterised by hydroxyl terminal groups and are of a bifunctional or polyfunctional nature.

Diisocyanates and polyisocyanates, or mixtures thereof, are suitable for the reaction with the aforementioned polyesters, polyester amides and polyglycol ethers. Examples of the diisocyanates, which may be used, are hexamethylene diisocyanate, toluylene diisocyanate, naphthylene diisocyanate, phenylene diisocyanate, 1-isopropyl-2,4-benzene diisocyanate, 4,4'-diphenyl methane diisocyanate. Examples of polyisocyanates are diphenyl 4,2,4'-triisocyanate and also the addition products of diisocyanates and an excess of polyalcohol. Instead of these free isocyanates, it is also possible to use derivatives which react at elevated temperature like polyisocyanates.

Furthermore, emulsifiers, additives and, if a foamed polyurethane is to be produced, water may be added to the main components.

The invention is illustrated but not limited by way of the following examples, all parts being by weight.

Example 1

A rigid foam with a bulk density of 50 kg./m.³ is produced from the following mixture:

80 parts of a polyester prepared from 3 mols of adipic acid, 3 mols of hexanetriol and 1 mol of butylene glycol, 20 parts of a polyester prepared from 3 mols of adipic acid, 2 mols of trimethylolpropane and 2 mols of butylene glycol, 10 parts of silicic chalk containing 10% of water, 3 parts of the adipic ester of N-diethyl ethanol amine, 2 parts of diethanol amine oleate, and 4 parts of a sulfonated castor oil are mixed and hereinafter referred to as "polyester mixture." The "polyester mixture" is reacted with 68 parts of toluylene diisocyanate.

The "polyester mixture" is fed to the mixing chamber during a period of 3 sec., using 150 injections, and at a pressure of 15 atm. The volume of the mixing chamber amounts to 145 ccm. The isocyanate component is injected at a rate of 150 injections per 3 seconds and at a pressure of 150 atm. The pressure inside of the chamber rises to 50 atm.

Example 2

A semi-rigid foam with a bulk density of 30 kg./m.³ is produced in the same manner as described in Example 1 by using the following mixtures:

50 parts of a polyester prepared from 2.5 mols of adipic acid, 0.5 mol of phthalic acid and 4 mols of hexanetriol, and 50 parts of a polyester prepared from 3 mols of adipic acid, 2 mols of trimethylolpropane and 2 mols of butylene glycol, 3 parts of silicic chalk containing 10% of water, 3 parts of the adipic ester of N-diethyl ethanol amine, and 10 parts of a sulfonated castor oil are used as "polyester mixture" and reacted with 95 parts of toluylene diisocyanate.

Example 3

A soft foamed product with a bulk density of 30 kg./m.³ is produced in the same manner as described in Example 1 by using the following mixture:

100 parts of a polyester prepared from 11 mols of ethylene glycol and 10 mols of adipic acid, 3 parts of the adipic ester of N-diethyl ethanol amine, 3 parts of a sulfonated castor oil, 2 parts of water and 0.5 part of paraffin oil are used as "polyester mixture" and reacted with 47.5 parts of toluylene diisocyanate.

Example 4

A rubber-like elastic polyurethane is obtained in the same manner as described in Example 1 by using the following mixtures:

100 parts of a polyester prepared from 11 mols of ethylene glycol and 10 mols of adipic acid are mixed with 7 parts of a sulfonated castor oil at a temperature of 70° C. and fed to the mixing chamber at this temperature. 1,5-naphthylene diisocyanate is fed to the mixing chamber at a temperature of 130° C.

Example 5

A polyester resin is readily prepared following the procedure of Example 1 by mixing 70 parts of an unsaturated polyester and 32 parts of a mixture consisting of 30 parts of styrene and 2 parts of benzoyl peroxide.

What is claimed is:

1. An apparatus for producing porous and homogeneous polyurethane plastics, comprising in combination an enclosed mixing cylinder, a piston disposed in said cylinder having an annular groove formed near the end thereof, means for introducing under pressure at least one of the components used to produce said plastics into said groove and then into the cylinder space of siad mixing cylinder, means for introducing under pressure another of said components into said mixing cylinder and into contact with said first mentioned component and means comprising said piston for ejecting the resulting mixture from said mixing cylinder.

2. An apparatus for producing porous and homogeneous polyurethane plastics as defined in claim 1, wherein said mixing cylinder is provided with a rotary slide valve for controlling the ejection of said mixture from said cylinder.

3. An apparatus for producing porous and homogeneous polyurethane plastics as defined in claim 2, wherein said first mentioned means is arranged so as to register with said annular piston groove when said piston is in the upper dead center position, while said second mentioned means communicates with the interior of said mixing cylinder near the end of said piston.

4. An apparatus for producing porous and homogeneous polyurethane plastics as defined in claim 3, wherein said first mentioned component is introduced continuously by means of a continuously operating pump and the introduction of the second mentioned component is regulated by pumps by means of a control device.

5. An apparatus for producing porous and homogeneous polyurethane plastics as defined in claim 4, wherein the introduction of said first mentioned component by a continuously operating pump is controlled in timed sequence by the position of said piston which closes and opens the inlet opening for said component.

6. An apparatus for producing porous and homogeneous polyurethane plastics as defined in claim 5, wherein the closure means for the mixing cylinder is coupled to a control device for the pumps which inject said second mentioned component.

7. An apparatus for producing porous and homogeneous polyurethane plastics as defined in claim 6, wherein means for supplying molds for receiving the mixture from said mixing cylinder is regulated by a control device in timed sequence with the operation of said apparatus.

8. An apparatus for producing porous and homogeneous polyurethane plastics as defined in claim 7, wherein the ejection piston is also rotatable.

9. An apparatus for producing porous and homogeneous polyurethane plastics as defined in claim 8, wherein stirring means are arranged on said piston, said means projecting from the face of the piston but being adapted to be retracted into said piston.

10. An apparatus for making plastics comprising, in combination, a mixing chamber, a piston disposed in said chamber having an annular groove in one end thereof, means for introducing under pressure at least one of the components used to produce the plastic into the groove and then into the chamber, means for introducing under pressure another of said components into the chamber and into contact with the first said component, and means comprising the piston for ejecting the resulting mixture from the chamber.

11. An apparatus for mixing liquids comprising a mixing chamber, a piston disposed in said chamber having an annular groove near one end thereof, means for introducing a liquid under pressure into said groove, passageways for said liquid from said groove into said chamber, means for introducing another liquid into the first said liquid adjacent said passageways, and means comprising the piston for ejecting the resulting mixture from the chamber.

References Cited in the file of this patent

UNITED STATES PATENTS

| | | |
|---|---|---|
| 2,346,228 | Merrill et al. | Apr. 11, 1944 |
| 2,430,033 | Stacy et al. | Nov. 4, 1947 |
| 2,478,013 | Roddy | Aug. 2, 1949 |
| 2,639,252 | Simon et al. | May 19, 1953 |